Figure 1:
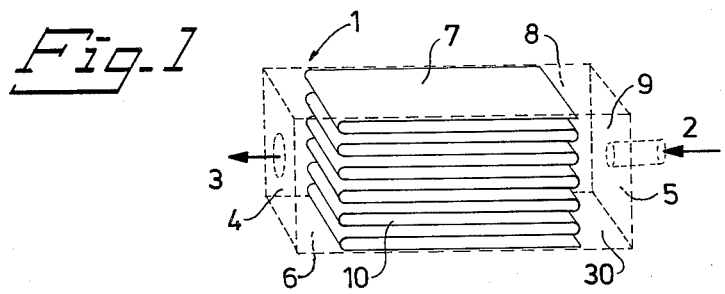

United States Patent [19]
Alskog

[11] 3,961,924
[45] June 8, 1976

[54] FILTER DEVICE
[75] Inventor: Magnus Alskog, Skara, Sweden
[73] Assignee: AB Lectrostatic, Skara, Sweden
[22] Filed: Feb. 20, 1975
[21] Appl. No.: 551,357

[30] Foreign Application Priority Data
Mar. 1, 1974 Sweden .............................. 7402786

[52] U.S. Cl. .................................. 55/500; 55/131; 55/521
[51] Int. Cl.² ......................................... B01D 27/06
[58] Field of Search ............. 55/497, 499, 500, 521; 210/493

[56] References Cited
UNITED STATES PATENTS

| | | | |
|---|---|---|---|
| 2,008,751 | 7/1935 | Davies | 55/500 |
| 2,681,155 | 6/1954 | Graham | 55/500 |
| 2,720,937 | 10/1955 | Root, Jr. | 55/500 |
| 2,907,407 | 10/1959 | Engle et al. | 55/500 |
| 2,923,376 | 2/1960 | Byrnes | 55/500 |
| 3,494,466 | 2/1970 | Rose et al. | 210/493 |
| 3,757,499 | 9/1973 | Scott | 55/500 |

FOREIGN PATENTS OR APPLICATIONS

| | | | |
|---|---|---|---|
| 790,181 | 2/1958 | United Kingdom | 55/497 |

*Primary Examiner*—Bernard Nozick
*Attorney, Agent, or Firm*—Kinzer, Plyer, Dorn & McEachran

[57] ABSTRACT

A self contained filter assembly for cleaning air and gas which is light-weight, inexpensive and easily disposable. The filter assembly includes a housing having walls formed of corrugated cardboard. A paper filter element in the form of a paper web is positioned in the housing and is folded in an accordian-like manner to form a plurality of web portions. The web portions form pockets which alternately open in the direction of flow of the air or gas being cleaned. Spacer elements positioned in the web pockets are fastened to the side walls of the housing to reinforce the housing and to counteract outwardly and inwardly lateral forces acting on the housing walls. The spacer elements also are shaped to resist bending along their lengths and to absorb tensile and compression forces occurring in the direction of flow of the air through the housing.

1 Claim, 6 Drawing Figures

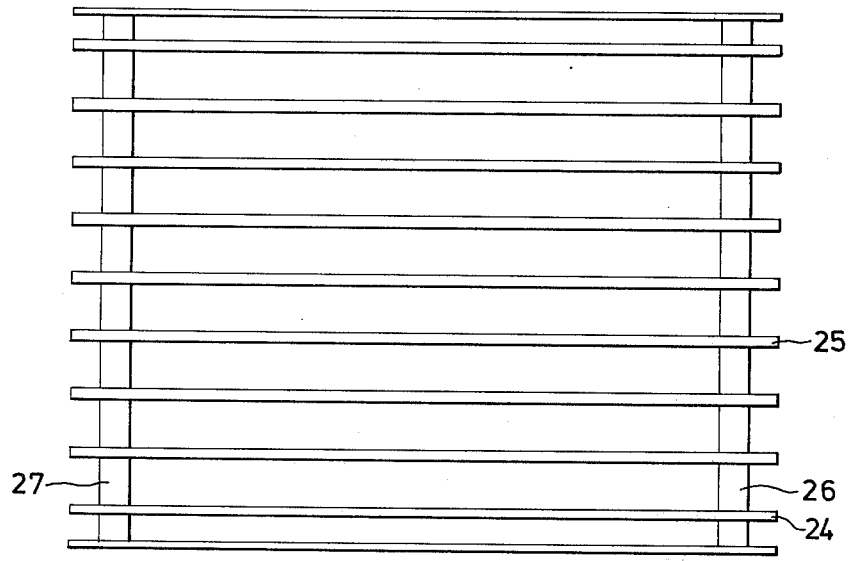
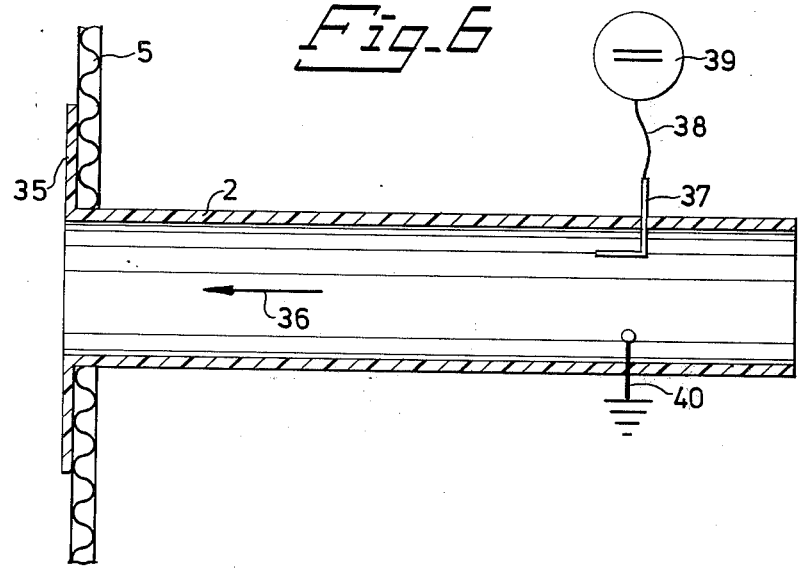

FILTER DEVICE

The present invention relates to a filter device comprising a closed housing having inlet means for air or gas and outlet for air or gas and at least one filter element arranged in the flow path of said air or gas, said filter element being of the type which comprises a filter web of preferably paper which is permeable to air and gas but which is impermeable to particles contained in the air or gas, said web being folded to form a plurality of juxtaposed web portions, plate-like or grid-like gas or air permeable spacer means disposed generally parallel to one another and arranged to support pairs of said web portions at a distance from each other to form pockets, of which pockets the opening of each alternate pocket is arranged to face the flow of gas or air and the bottom of each other pocket is arranged to face said flow of air or gas, the spacer means arranged in each of said pockets having edge portions which extend along respective edges of the pocket and also along two mutually opposed wall surfaces of the housing.

Although filter devices of this type, which devices may be used to filter welding fumes, for example, are very effective, they are encumbered with the disadvantage that, because the housing is subjected to pressures higher than or lower than atmospheric the housing must be made extremely robust and as a result is heavy and cumbersome to move.

The principle object of the invention is therefore to provide a filter device of extremely simple and inexpensive construction and which has the same or a greater capacity than the known filter devices and is able to resist the differences in pressure which occur without danger of the walls of the housing collapsing or bursting. This object is achieved despite the fact that the housing is preferably made entirely of corrugated cardboard, in accordance with the invention.

A filter device by means of which said object is achieved is described in the accompanying claims.

Figure 2:
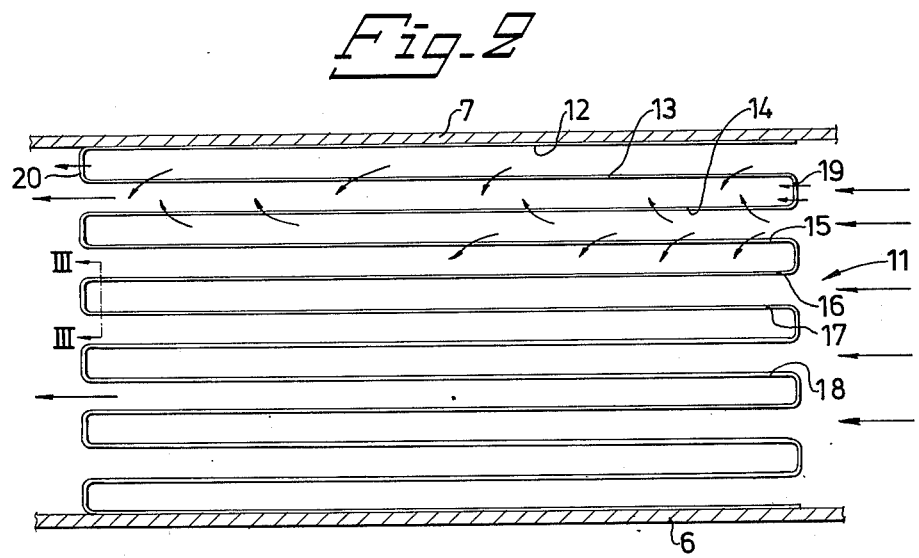
Figure 3:
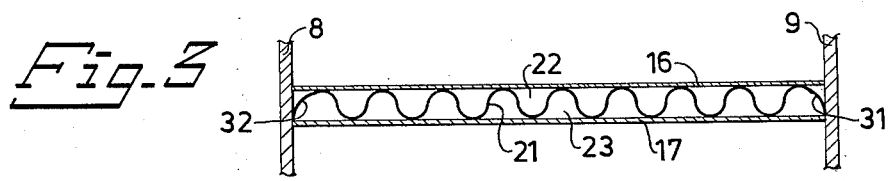
Figure 4:
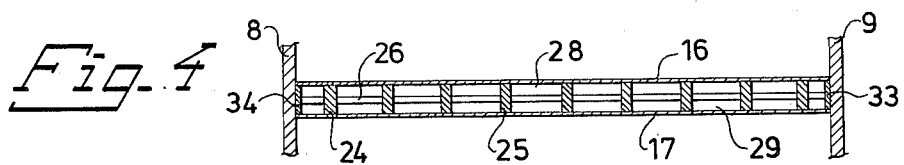

An embodiment of the invention will now be described with reference to the accompanying drawing, in which:

FIG. 1 shows a filter device according to the invention in a much simplified form, FIG. 2 shows the mode of operation of the filter element, FIG. 3 is a sectional view along the line III—III in FIG. 2 and shows a preferred type of spacer means arranged between pairs of mutually co-acting filter web portions, FIG. 4 shows another type of spacer means, FIG. 5 is a plan view of the spacer means shown in FIG. 4 and FIG. 6 shows a device for charging particles contained in the air or gas being filtered.

In FIG. 1 there is shown in chain lines a filter housing 1 having an inlet 2 for the air or gas to be filtered and an outlet 3. With the illustrated embodiment the outlet 3 comprises an opening located in one end wall 4 of the housing and the inlet 2 is shown in the form of the tube connected to the end wall 5 opposite the end wall 4. In this embodiment the housing has a bottom 6, an upper side 7 and two side walls 8 and 9. The air or gas is thus caused to flow from the inlet 2 to the outlet 3 and means (not shown) such as a suction or a blower fan is provided to cause the air or gas to flow through the housing 1. It will be understood that although only one opening 3 has been shown a plurality of such openings may be provided and, if desired, the whole of the end wall 4 may be perforated. Alternatively the end wall 4 may be omitted thereby permitting the filtered air to flow freely out of the housing.

In the interior of the housing 1 there is a filter element 10 which is arranged to collect particles carried by the air or gas being filtered. Located between the end wall 5 and the end surface of the filter element 10 facing the gas flow is a separation chamber 30 in which heavy particles or particle agglomerates fall down onto the bottom 6. To prevent air or gas from flowing past the filter 10 the entire peripheral surface of the filter may be sealingly joined to the bottom 6, the upper side 7 and the two side walls 8 and 9. Alternatively at least a portion of the filter element extending peripherally around the end portion of said filter facing the inlet 2 and the outlet 5 may be sealingly joined to said sides.

The filter according to the invention is shown in FIG. 2 as seen perpendicularly to the side wall 9. As will be seen from FIG. 2, the filter comprises a web of air and gas permeable material, preferably paper or a similar fibrous material, having a width corresponding to the distance between the side walls 8 and 9, which the illustrated embodiment are shown to be parallel to one another. The paper web 11, which is a continous web, is folded to form a plurality of superimposed web portions, such as the web portions 12, 13, 14, 15, 16, 17 and 18 which merge with each other via connecting portions, such as the portions 19, and 20, pairs of said web portion forming pockets therebetween. The opening or bottom of alternate pockets is arranged to face the flow of air or gas being filtered.

It should be noted that although only one paper web is shown a plurality of over-lapping paper webs can be employed.

With the illustrated embodiment, all web portions 12-18 are mutually of the same length as seen in the direction of flow, although the filter may be provided with web portions of different length and pockets of different depth.

The arrows shown on the right of FIG. 2 indicate the direction in which the air or gas flows into the housing 1. The air or gas impinges on the connecting portions, for example portion 19, particles carried in the flow being removed at said web portion and the air or gas flowing into the openings between two web portions, such as web portions 14 and 15, and into the pocket defined by said web portions and adjoining side walls 8 and 9.

As shown in FIG. 2, the gas or air flowing through an opening is filtered across the whole of the filter surface defined by two mutually adjacent web portions and the connecting portion joining said adjacent web portion, whereby the filter obtains a very wide active surface despite the fact that the input surface is relatively small, the area of said input surface with the illustrated embodiment corresponding approximately to the area of the end wall 5.

This means that the rate of flow of the particles is also relatively low and that part of the particles are suspended in front of the filter surface and there bind together with other particles to form agglomerates which settle on the surface of the filter web without penetrating said web to any appreciable extent.

The web portions 12-18 are held apart by means of spacer elements which are preferably so formed that mutually separated grooves or channels extending in the direction of flow are formed between the filter webs.

A preferred embodiment of a spacer element 21 is shown in FIG. 3. With the illustrated embodiment the spacer element 21 comprises a serpentine-like web of paper, such as the corrugated paper portion of corrugated cardboard laminates. Formed between this paper web and the two filter web portions 16 and 17 adjacent thereto are channels, such as channels 22 and 23, of which one channel, 22, is connected to the filter web 16 and the other channel, 23, is connected to the filter web 17. The spacer element 21 may also have the form of a plurality of serpentine-like paper webs provided with intermediate flat paper sheets, there being thus formed inner channels which are isolated from the mutually facing filter webs. This embodiment is particularly useful when the filter is to be used for electrostatic precipitation, in which particles are precipitated onto the walls of the inner channels and on the walls of the channels facing the filter webs and on the filter webs themselves.

With the embodiment illustrated in FIGS. 4 and 5, the spacer element comprises ribs, such as the ribs 24 and 25, which are arranged in the direction of flow and which are held together by means of narrow strips 26 and 27. The strips 26 and 27 together with the ribs, such as ribs 24 and 25, form a self-supporting grid structure which is highly resistant to bending in the long direction of the strips and which can take-up high compression and tensile forces in said long direction. As will best be seen from FIG. 4, there is formed between each pair of adjacent ribs through-channels, such as channels 28 and 29, which communicate with portions of the filter web, such as filter web portions 16 and 17, lying above and beneath said flow channels. It is essential with respect to the invention that the plate-like spacer elements, each of which projects into a pocket and is preferably parallel with the remaining spacer elements, are so arranged that they clamp the filter web therebetween to hold said web in position. The requisite clamping force is provided by the fact that the unit formed by the spacer elements and the filter web is clamped securely between the bottom 6 and the upper side 7 of the housing 1. In accordance with the invention, the free edges of the spacer elements facing the side walls 8 and 9, such as the edges 31 and 32 in FIG. 3, are securely connected to adjacent side walls 8 and 9. Thus, when the pressure in the housing 1 is above the prevailing ambient pressure, the side walls 8 and 9 are positively prevented from being forced outwards, since the large number of intermediate spacer elements fully absorbe the tensile forces which thus occur. Furthermore, since the side portions of the filter element are fully sealed against the walls of the box, the bottom and the upper side 7 are not subjected to pressure forces of any appreciable magnitude and thus the problem prevailing with known filter housing constructions having walls which themselves are required to take-up pressures which are above or below the prevailing ambient pressure is totally eliminated.

The only portion of the filter housing which, without any particular reinforcement, is permitted to take-up the pressure difference between the interior of the housing and the surroundings are the wall portions which define pre-chamber 30 and outlet chamber respectively when the filter is connected to the suction side. The wall portions extending parallel with the flow direction are relatively short and do not offer any problem with respect to mechanical strength, and the end surface 5 is effectively reinforced by the substantially solid ring formed by the connecting portions on the side surfaces, the bottom surface and the upper surface.

In an analogous manner the side portions 33 and 34 of the spacer element shown in FIG. 4 and FIG. 5 respectively are securely connected to adjacent side walls 8 and 9, thereby also to provide in this case an extremely firm construction.

The aforedescribed spacer elements have only been shown as example and other types may be used, for example a disc-like or plate-like spacer element having shoulders or the like on both side surfaces thereof, said shoulders holding the filter webs apart, and the side edges of the spacer elements may be securely connected to corresponding side walls of the housing.

Although with the illustrated embodiments the filter web has a constant width from the upper side of the filter to its lower side, it will be understood that filters which taper from the inlet side to the outlet side may also be constructed, the filter web being formed in a corresponding manner.

A filter device as described above in which the housing comprises a totally of corrugated cardboard has a weight of 12 kg, including the fan (not shown), in comparison with a conventional filter device of corresponding capacity, which has a weight of 55 kg.

Since the filter device can be made practically totally of any type of paper it will be obvious that in addition to reducing the weight, the costs of manufacturing such a filter device are also greatly reduced. As will also be understood, when the filter device according to the invention with which the spacer elements are securely connected to the filter housing can no longer clean the air or gas to the desired extent, the filter device can be burned.

When spacer elements of the type shown in FIG. 3 are used, the filter device is, in addition to the purely mechanical cleansing function, also suitable for electrostatic separation of particles, in which case the requisite ionisation of the particles can be effected to advantage with the means shown in FIG. 6. In FIG. 2 the inlet tube 2 shown in FIG. 1 is shown connected to the end wall 5 which, similarly to the remaining walls of the housing, comprises corrugated cardboard. A tube 2 has a flange 35 which is glued securely to the inside of the end wall 5. The free end of the tube 2 is intended to be connected to a hose and the flow direction of the gas or the air is shown by the arrow 36. The inlet tube 2 is made of a material having good electroinsulating properties, such as a plastics material. To the outer end of the tube there is connected a high-voltage electrode 37, which in turn is connected to a high-voltage generator 39 via a line 38. The high-voltage electrode 37 is arranged to co-act with an earthed electrode 40 so that there can be formed between said electrodes a field in which the particles are charged. The particles move at very high speed in the insulated tube 2, such as a speed of 50 meters per second, and in this way are given a very high kinetic energy, which means that the potential level of the particles is very high. Tests have shown that a particle charging device of the described type prevents precipitation of the particles onto the inside of the tube, this probably being due to the fact that the insulated inner wall of the tube lies on a higher level than the particles, and the particles are therefore concentrated to a string of particles in the centre of the tube. This concentration of the particles affords the important advantage that said particles form agglomerates which fall down in the pre-separation chamber and thus do not load the filter element. When placed on a supporting surface the described filter device having a corrugated cardboard housing is sufficiently earthed from a high-voltage point of view for a precipitation of the charged particles to take place on the filter web and on the walls of the grooves or channels formed by the spacer elements.

I claim:
1. A self-contained filter assembly including:
- a housing having top, bottom, side and end walls formed of cardboard,
- an inlet in one end wall of said housing and an outlet in the opposite end wall thereof,
- a filter element positioned in said housing in the path of flow of contaminated air and gas through said housing,
- said filter element including a filter web of air and gas permeable, particle collecting material such as paper,
- said filter web being formed in an accordion-like manner in which adjacent portions of the filter web extend generally parallel to each other and form pockets which alternately open in opposite directions, one set of pockets opening in the direction of flow of air and gas through the filter housing, and
- a spacer element installed in each pocket to engage and support adjacent portions of said filter web,
- each spacer element including a plurality of elongated ribs extending lengthwise in the direction of flow of air and gas through said housing, said ribs being spaced apart across the width of said housing to form longitudinally extending channels between said ribs to permit air and gas to pass through the spacer element, the outermost ribs on the sides of each spacer element being fastened to the side walls of said housing, and
- cross bracing extending between said ribs to strengthen the spacer element thereby permitting the spacer element to reinforce said housing to thereby counteract outwardly and inwardly directed forces resulting from the movement of air and gas through said housing during filtering operations, said ribs having sufficient strength to resist bending and to absorb tensile and compressive forces acting in the direction of flow of air and gas through the housing.

* * * * *